US012610416B2

(12) United States Patent
Hokazono et al.

(10) Patent No.: US 12,610,416 B2
(45) Date of Patent: Apr. 21, 2026

(54) TERMINAL AND COMMUNICATION METHOD

(71) Applicant: NTT DOCOMO, INC., Tokyo (JP)

(72) Inventors: Yuki Hokazono, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 302 days.

(21) Appl. No.: 18/550,208

(22) PCT Filed: Mar. 14, 2022

(86) PCT No.: PCT/JP2022/011321
§ 371 (c)(1),
(2) Date: Sep. 12, 2023

(87) PCT Pub. No.: WO2022/202441
PCT Pub. Date: Sep. 29, 2022

(65) Prior Publication Data
US 2024/0163949 A1 May 16, 2024

(30) Foreign Application Priority Data
Mar. 25, 2021 (JP) ................................. 2021-052080

(51) Int. Cl.
*H04W 76/15* (2018.01)
*H04W 72/0453* (2023.01)
*H04W 84/06* (2009.01)
(52) U.S. Cl.
CPC ....... *H04W 76/15* (2018.02); *H04W 72/0453* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 2021/0219228 A1* | 7/2021 | Matsuda | ........... | H04W 72/0453 |
| 2022/0264257 A1* | 8/2022 | Hofmann | .............. | G01S 5/0072 |
| 2022/0279404 A1* | 9/2022 | Wakabayashi | ........ | H04W 36/08 |
| 2023/0247506 A1* | 8/2023 | Xu | .................... | H04W 36/0064 |
| | | | | 370/331 |

FOREIGN PATENT DOCUMENTS

| | | |
|---|---|---|
| CN | 112312382 A | 2/2021 |
| WO | 2020/026734 A1 | 2/2020 |

OTHER PUBLICATIONS

Office Action issued in counterpart Japanese Application No. 2021-052080, mailed May 14, 2024 (7 pages).

(Continued)

*Primary Examiner* — Srinivasa R Reddivalam
(74) *Attorney, Agent, or Firm* — Osha Bergman Watanabe & Burton LLP

(57) ABSTRACT

A terminal includes: a control unit configured to establish a wireless connection between a first communication device included in a terrestrial network and a second communication device included in a non-terrestrial network; and a communication unit configured to transmit and receive a control signal and a data signal to and from a core network via the first communication device, the second communication device, and a gateway of the non-terrestrial network.

5 Claims, 10 Drawing Sheets

(56) References Cited

OTHER PUBLICATIONS

Thales: "NTN multi connectivity", 3GPP TSG RAN WG3 Meeting #103bls, R3-191219; XI'An, Apr. 8-12, 2019 (8 pages).

3GPP TR 38.821 V16.0.0; "3rd Generation Partnership Project; Technical Specification Group Radio Access Network; Solutions for NR to support non-terrestrial networks (NTN) (Release 16)"; Dec. 2019 (140 pages).

Konishi et al; "A Study of Downlink Spectrum Sharing in HAPS Mobile Communication Systems"; 2020 General Conference of the Institute of Electronics, Information and Communications Technology, B-17-1, p. 511; Mar. 17, 2020 (3 pages).

International Search Report issued in corresponding International Application No. PCT/JP2022/011321, mailed on May 24, 2022 (5 pages).

Written Opinion issued in corresponding International Application No. PCT/JP2022/011321, mailed on May 24, 2022 (4 pages).

ZTE; "Further Discussion on NTN Architecture Issues"; 3GPP TSG RAN WG3#101bis, R3-185409; Chengdu, China; Oct. 8-12, 2018 (4 pages).

LG Electronics Inc.; "Dual connectivity use cases in NTN"; 3GPP TSG-RAN WG2 Meeting #107, R2-1911298; Prague, Czech Republic; Aug. 26-30, 2019 (3 pages).

* cited by examiner

FIG.8

TERMINAL AND COMMUNICATION METHOD

FIELD OF THE INVENTION

The present invention relates to a terminal and a communication method.

BACKGROUND OF THE INVENTION

In NR (New Radio) (also referred to as "5G"), which is a successor system of LTE (Long Term Evolution), in a standardization project, 3GPP (Third Generation Partnership Project), technical specifications are being discussed and developed for technologies that satisfy the following requirements: a high capacity system, high-speed data transmission rate, low delay, simultaneous connection of multiple terminals, low cost, power saving, etc.

In addition, in recent years, a technology has been discussed that enables coverage of areas such as mountainous regions, remote regions, and the sea by non-terrestrial networks (NTNs) using a high-altitude platform station (HAPS) or a high-altitude pseudo satellite (for example, see Non-Patent Documents 1 and 2).

CITATION LIST

Non-Patent Document

[Non-Patent Document 1] 3GPP TR 38.821 V16.0.0 (2019-12)

[Non-Patent Document 2] Konishi, et al., "A Study of Downlink Spectrum Sharing in HAPS Mobile Communication System", the Institute of Electronics, Information and Communication Engineers (IEICE) General Conference, B-17-1, 2020

SUMMARY OF THE INVENTION

Technical Problem

According to conventional technologies, in a case where wireless communication services are provided by a non-terrestrial network, for example, at events such as concerts, during disasters, and over a wide area of the IoT (Internet of Things), there is a possibility that the communication speed is insufficient as compared with conventional terrestrial networks.

An object of the present disclosure is to provide a technique that improves the communication speed and reliability of the wireless communication that uses a non-terrestrial network.

Solution to Problem

According to the disclosed technique, a terminal is provided. The terminal includes: a control unit configured to establish a wireless connection between a first communication device included in a terrestrial network and a second communication device included in a non-terrestrial network; and a communication unit configured to transmit and receive a control signal and a data signal via the first communication device, the second communication device, and a gateway of the non-terrestrial network.

Advantageous Effects of Invention

According to the disclosed technique, it is possible to improve the communication speed and reliability of the wireless communication that uses a non-terrestrial network.

BRIEF DESCRIPTION OF THE DRAWINGS

FIG. 8 is a drawing illustrating an example (1) of dual connectivity according to an embodiment of the present invention.

DETAILED DESCRIPTION OF THE PREFERRED EMBODIMENTS

In the following, one or more embodiments of the present disclosure will be described with reference to the drawings. Note that the embodiments described below are examples. Embodiments of the present disclosure are not limited to the following embodiments.

In the wireless communication system according to an embodiment of the present disclosure, known techniques may be used as appropriate. The known techniques may be, for example, 5G and Beyond 5G. Note that disclosed techniques of the present invention may be applicable not only to the 5G etc. but also to any wireless communication system.

System Configuration

Figure 1:
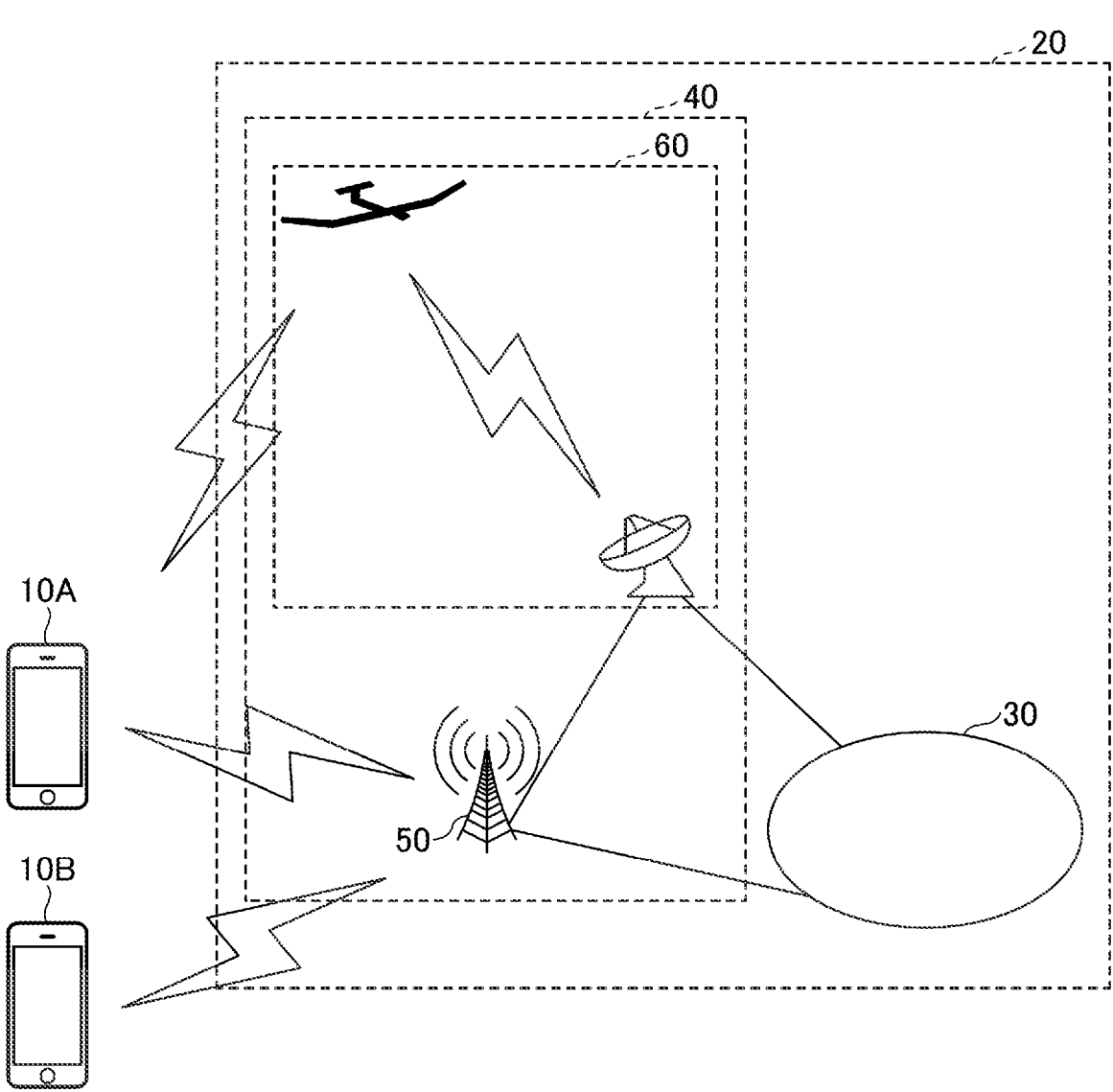
FIG. 1 is a drawing illustrating a system configuration of a wireless communication system 1 according to an embodiment of the present invention.

FIG. 1 is a drawing illustrating a system configuration of a wireless communication system 1 according to an embodiment of the present invention. The wireless communication system 1 according to an embodiment of the present invention includes user terminals 10A and 10B (hereinafter, also simply referred to as "user terminals 10" when there is no need to distinguish between them), and a communication network 20. Note that the number of the user terminals 10 is not limited to the example in FIG. 1.

The user terminal 10 may be a communication device that includes a wireless communication function, such as a smartphone, a mobile phone, a tablet, a wearable terminal, a communication module for M2M (Machine-to-Machine), or the like. Note that the user of the user terminal 10 may sign a predetermined contract with a mobile communication carrier (Mobile Network Operator, MNO) so that the user can use various communication services of the communication network 20 provided by the mobile communication carrier, or the like. In the user terminal 10, for example, a medium for identifying a subscriber (for example, a SIM (Subscriber Identity Module) card) distributed (lent) by the mobile communication carrier, may be inserted.

The user terminal 10 may use various communication services provided by the communication network 20 by using the identification information recorded in the SIM card. The various communication services may include data services in which data is transmitted and received over the Internet. In addition, the various communication services may include voice services for making and receiving voice calls. Note that the voice services may include, for example, a service that enables outgoing and incoming voice calls using VoNR (Voice over New Radio) which is a voice call technology on the 5G network. In addition, the voice services may include, for example, a service that enables outgoing and incoming voice calls by switching a communication network accommodating the user terminal 10 to a communication network of 4G or 3G (by performing the fallback), at the time of the outgoing and incoming voice calls.

(Communication Network 20)

The communication network 20 provides various services such as voice services and data services to the user terminal 10. The communication network 20 includes a core network 30 and a RAN (Radio Access Network) 40. The core network 30 may, for example, manage information of users (subscribers) of user terminals 10, manage sessions such as voice calls, transmit data via the Internet, etc.

The communication network 20 may be, for example, an NSA (Non-Stand Alone) type 5G network using 4G (including LTE or LTE-A) EPC (Evolved Packet Core) as the core network 30 and using en-gNB, which is a 5G base station, for some base stations as the RAN 40. In this case, the communication network 20 may, for example, transmit and receive control signals using eNB, which is a 4G base station, and transmit and receive data using en-gNB, which is a 5G base station.

In addition, the communication network 20 may be an SA (Stand Alone) type 5G network using a 5G core network (5GC) as the core network 30 and using gNB, which is a 5G base station, as at least some base stations as the RAN 40. In this case, the communication network 20 may, for example, transmit and receive control signals and data using gNB.

The RAN 40 includes a terrestrial network 50 and a non-terrestrial network 60. The terrestrial network 50 is, for example, a network that performs wireless communication directly with the user terminal 10 via a base station 51 installed in a facility that is on the ground.

The Non-Terrestrial Network (NTN) 60 is, for example, a network that performs wireless communication with the user terminal 10 via an object (a non-terrestrial object) other than an object placed on the ground. The non-terrestrial network 60 may use, for example, a high-altitude pseudo-satellite (HAPS, High Altitude Platform Station, or High Altitude Pseudo Satellite), a flying vehicle such as an unmanned aerial vehicle, or a spacecraft such as a satellite, as a relay device (repeater, relay station) or a base station. For example, in a case where a HAPS is used that resides in a fixed location at an altitude of approximately 20 km, the non-terrestrial network 60 can, for example, form a wide coverage area on the ground (land) with a cell radius of 50 km or more.

A base station 61 of the non-terrestrial network may include a CU (Centralized Unit) 65 and a DU (Distributed Unit) 66. The CU 65 may be referred to as a centralized node, and the DU 66 may be referred to as a distributed node. The CU 65 may be connected to the DU 66 via a front-haul interface between the CU 65 and the DU 66. The division between the CU and DU may be located, for example, between the upper PHY layer and the lower PHY layer, between the PHY layer and the MAC (Media Access Control) layer, or between the RLC (Radio Link Control) layer and the PDCP (Packet Data Convergence Protocol) layer. Similarly, a base station 51 of the terrestrial network may include a CU 55 and a DU 56.

The DU 66 and the DU 56 establish a wireless connection to the user terminal 10. The CU 65 and the CU 55 are connected to the core network 30. The CU 65 and the CU 55 may transmit a control signal and a data signal received from the user terminal 10 to the core network 30, and may transmit a control signal and a data signal received from the core network 30 to the user terminal.

Example of Transparent Type

Figure 2:
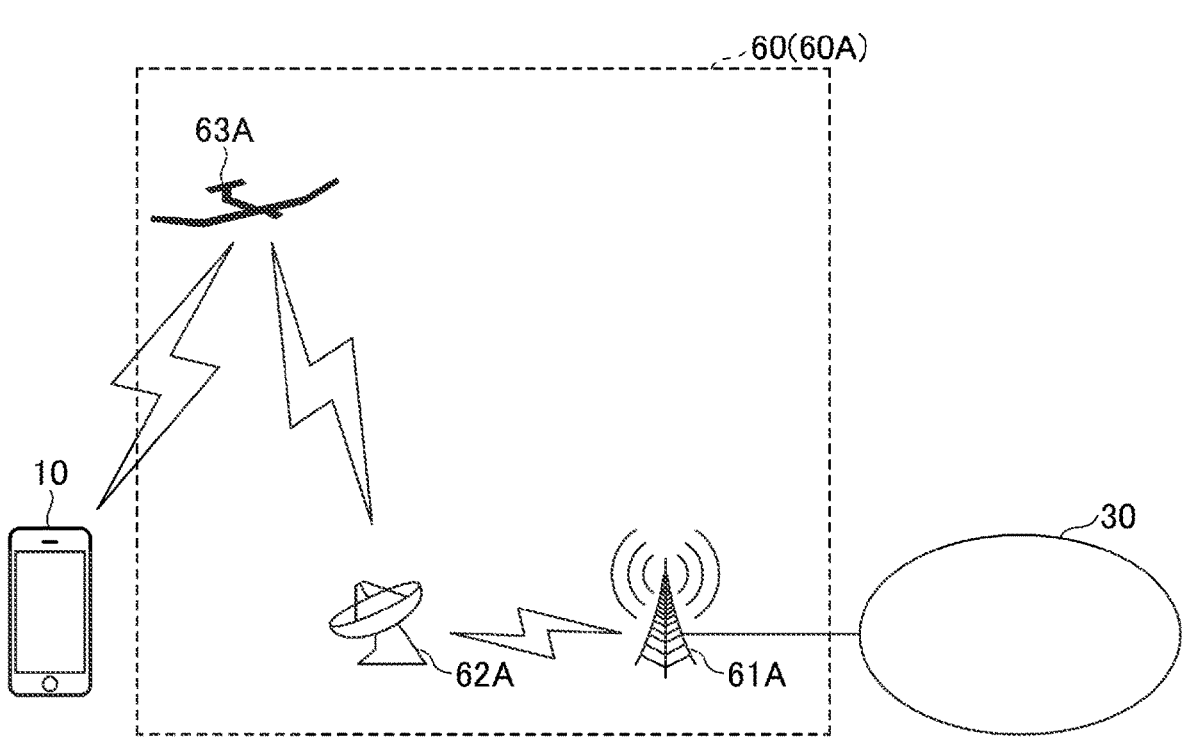
FIG. 2 is a drawing illustrating a configuration example (1) of a non-terrestrial network 60 according to an embodiment of the present invention.

FIG. 2 is a drawing illustrating an example (No. 1) of a configuration of a non-terrestrial network 60 according to an embodiment of the present invention. The non-terrestrial network 60 may be a transparent type NTN in which a non-terrestrial object has a relay device, as shown in FIG. 2. In the example of FIG. 2, the non-terrestrial network 60 (60A) includes a base station 61A placed on the ground, an NTN gateway 62A placed on the ground, and a non-terrestrial object 63A.

In the example of FIG. 2, the data transmitted from the core network 30 to the user terminal 10 is first transmitted from the core network 30 to the base station 61A. The base station 61A then transmits the received data to the non-terrestrial object 63A via the NTN Gateway 62A using downlink radio signals. The non-terrestrial object 63A then relays (transfers) the received downlink radio signals to the user terminal 10 by using the relay.

In addition, data to be transmitted from the user terminal 10 to the core network 30 is first transmitted from the user terminal 10 to the non-terrestrial object 63A by using uplink radio signals. The non-terrestrial object 63A then relays (transfers) the received uplink radio signals to the NTN gateway 62A by using the relay. The NTN gateway 62A then transmits the received uplink radio signals wirelessly or in a wired method to the base station 61A. The base station 61A then transmits the data received from the NTN gateway 62A to the core network 30.

Example of Regenerative Type

Figure 3:
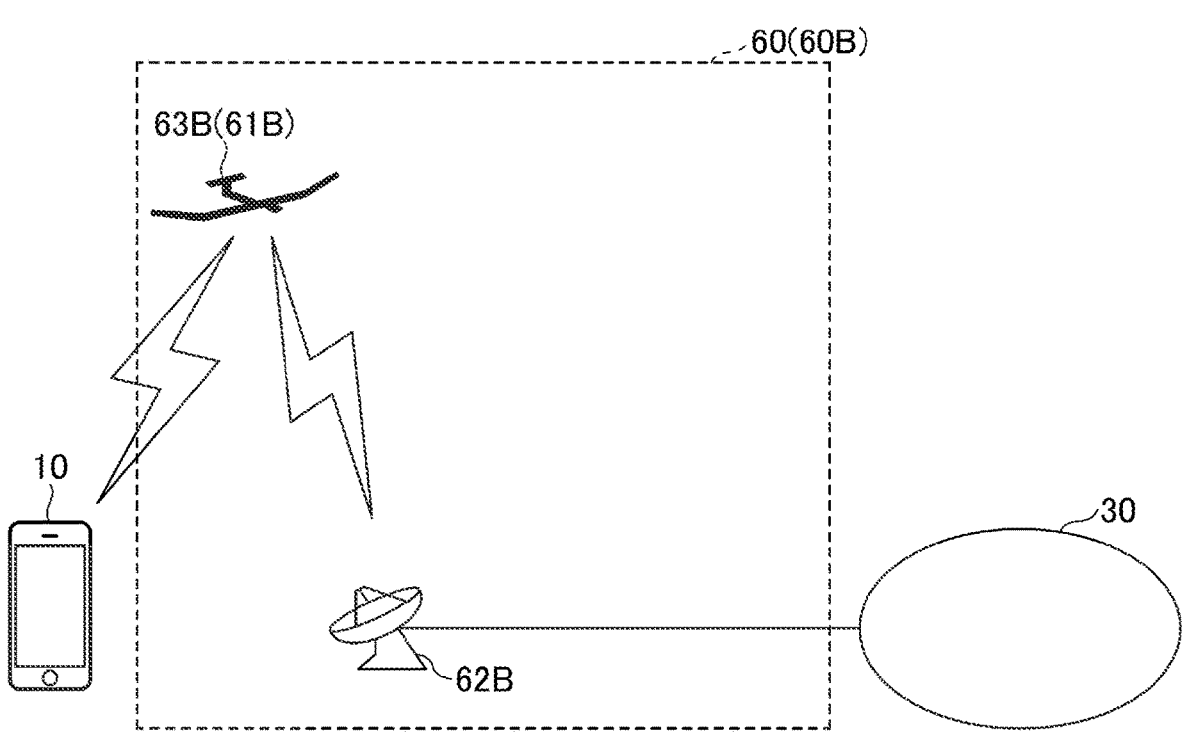
FIG. 3 is a drawing illustrating a configuration example (2) of a non-terrestrial network 60 according to an embodiment of the present invention.

FIG. 3 is a drawing illustrating an example (No. 2) of a configuration of a non-terrestrial network 60 according to an embodiment of the present invention. The non-terrestrial network 60 may be a regenerative-type NTN in which a non-terrestrial object includes a base station, as shown in FIG. 3. In the example of FIG. 3, the non-terrestrial network 60 (60B) includes an NTN gateway 62B placed on the ground and a non-terrestrial object 63B with a base station 61B.

In the example of FIG. 3, the data transmitted from the core network 30 to the user terminal 10 is first transmitted by radio waves (radio signals) from the core network 30 to the base station 61B of the non-terrestrial object 63B via the NTN gateway 62B. The base station 61B of the non-terrestrial object 63B then generates downlink radio signals, based on the received data, and transmits the generated radio signals to the user terminal 10.

In addition, data to be transmitted from the user terminal 10 to the core network 30 is first transmitted from the user terminal 10 to the non-terrestrial object 63B by using uplink radio signals. The base station 61B of the non-terrestrial object 63B then transmits the received data to the core network 30 via the NTN gateway 62B.

(Apparatus Configuration)

An example of the functional configuration of the user terminal 10 and the non-terrestrial network 60 will be described with reference to FIG. 4 and FIG. 5.

<User Terminal 10>

Figure 4:
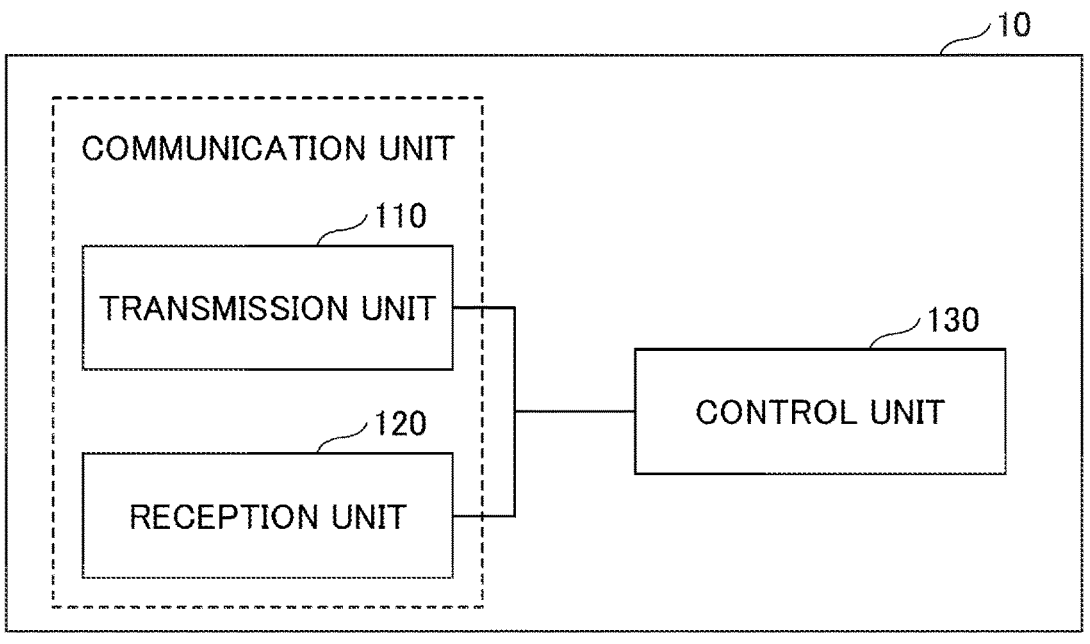
FIG. 4 is a drawing illustrating an example of a functional structure of a user terminal 10 according to an embodiment of the present invention.

FIG. 4 is a drawing illustrating an example of a functional structure of the user terminal 10 according to an embodiment of the present invention. As shown in FIG. 4, the user terminal 10 includes a transmission unit 110, a reception unit 120, and a control unit 130. Each of the units may be implemented, for example, by cooperation between hardware such as a processor of the user terminal 10, and software installed in the user terminal 10.

Note that the functional structure illustrated in FIG. 4 is merely an example. Functional divisions and names of functional units may be any division and name as long as operations are performed according to an embodiment of the present invention. For example, the transmission unit 110 and the reception unit 120 may be collectively referred to as a communication unit.

The transmission unit 110 transmits data to the communication network 20. The reception unit 120 receives data from the communication network 20. Further, the reception unit 120 receives, for example, information related to the carrier aggregation or dual connectivity configuration.

The control unit 130 performs various controls in the user terminal 10. The control unit 130 controls wireless communication with the base station 61, or the like, based on the information that is received by the reception unit 120 and that is related to the carrier aggregation or dual connectivity configuration.

<Non-Terrestrial Network 60>

Figure 5:
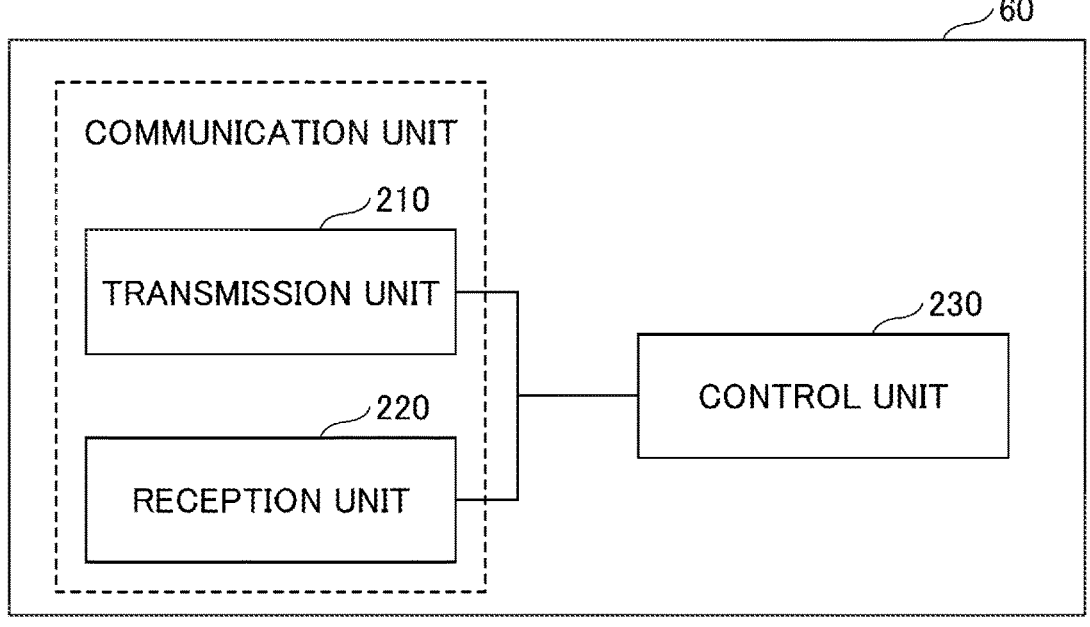
FIG. 5 is a drawing illustrating an example of a functional structure of the non-terrestrial network 60 according to an embodiment of the present invention.

FIG. 5 is a drawing illustrating an example of a functional structure of the non-terrestrial network 60 according to an embodiment of the present invention. As shown in FIG. 5, a device such as a base station 61 included in the non-terrestrial network 60 includes a transmission unit 210, a reception unit 220, and a control unit 230. Each of the units may be implemented, for example, by cooperation between hardware such as a processor of the device such as a base station included in the non-terrestrial network 60 and software installed in the device.

Note the functional structure illustrated in FIG. 5 is merely an example. Functional divisions and names of functional units may be any division and name as long as operations are performed according to an embodiment of the present invention. For example, the transmission unit 210 and the reception unit 220 may be collectively referred to as a communication unit.

The transmission unit 210 transmits data to the user terminal 10 and the core network 30. The reception unit 220 receives data from the user terminal 10 and the core network 30. The reception unit 220 receives, for example, information related to the carrier aggregation or dual connectivity configuration.

The control unit 230 performs various controls in the non-terrestrial network 60. The control unit 230 controls wireless communication with the user terminal 10, based on the information that is received by the reception unit 220 and that is related to the carrier aggregation or dual connectivity configuration.

(Carrier Aggregation)

In the terrestrial network 50, the user terminal 10 and the base station 51 can perform carrier aggregation (CA: Carrier Aggregation) in which communications are performed by bundling a plurality of cells, that is, a plurality of CCs (Component Carrier). In the carrier aggregation, one primary cell (PCell: Primary cell) and one or more secondary cells (SCell: Secondary cell) are used.

(Dual Connectivity)

In a case where DC (Dual connectivity) is performed in the terrestrial network 50, a base station 51A that is an MN (Master Node) and a base station 51B that is an SN (Secondary Node) are provided in the terrestrial network 50. The base station 51A and the base station 51B are each connected to a core network. The user terminal 10 can perform communications with both the base station 51A and the base station 51B.

A cell group provided by the base station 51A that is an MN is called an MCG (Master Cell Group), and a cell group provided by the base station 51B that is an SN is called an SCG (Secondary Cell Group). In addition, in DC, the MCG includes one PCell and one or more SCells, and the SCG includes one PSCell (Primary SCG Cell) and one or more SCells.

Note that the DC may be a communication method using two communication standards, and any type of communication standards may be combined. For example, the combination may be NR and 6G standards, or may be LTE and 6G standards. In addition, the DC may be a communication method using three or more communication standards and may be referred to as another name different from the DC.

(Processing)

Figure 6:
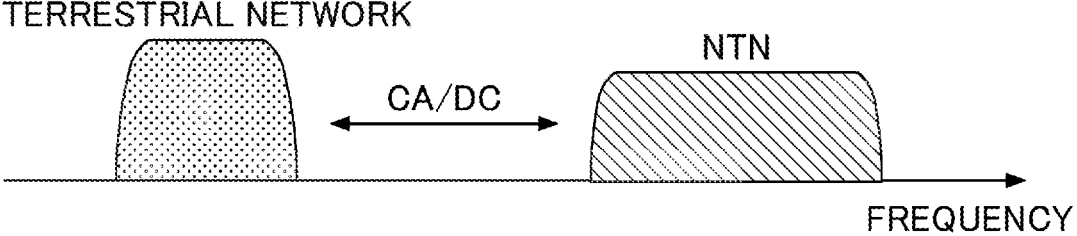
FIG. 6 is a drawing illustrating an example of a frequency band according to an embodiment of the present invention.

FIG. 6 is a drawing illustrating an example of a frequency band according to an embodiment of the present invention. As illustrated in FIG. 6, communications, in which carrier aggregation or dual connectivity is applied, may be performed by using different frequency bands between the terrestrial network 50 and the non-terrestrial network. For example, as illustrated in FIG. 6, the user terminal 10 may perform communications in which carrier aggregation or dual connectivity is applied in the non-terrestrial network 60 by using a frequency higher than the frequency of the terrestrial network 50.

Figure 7:
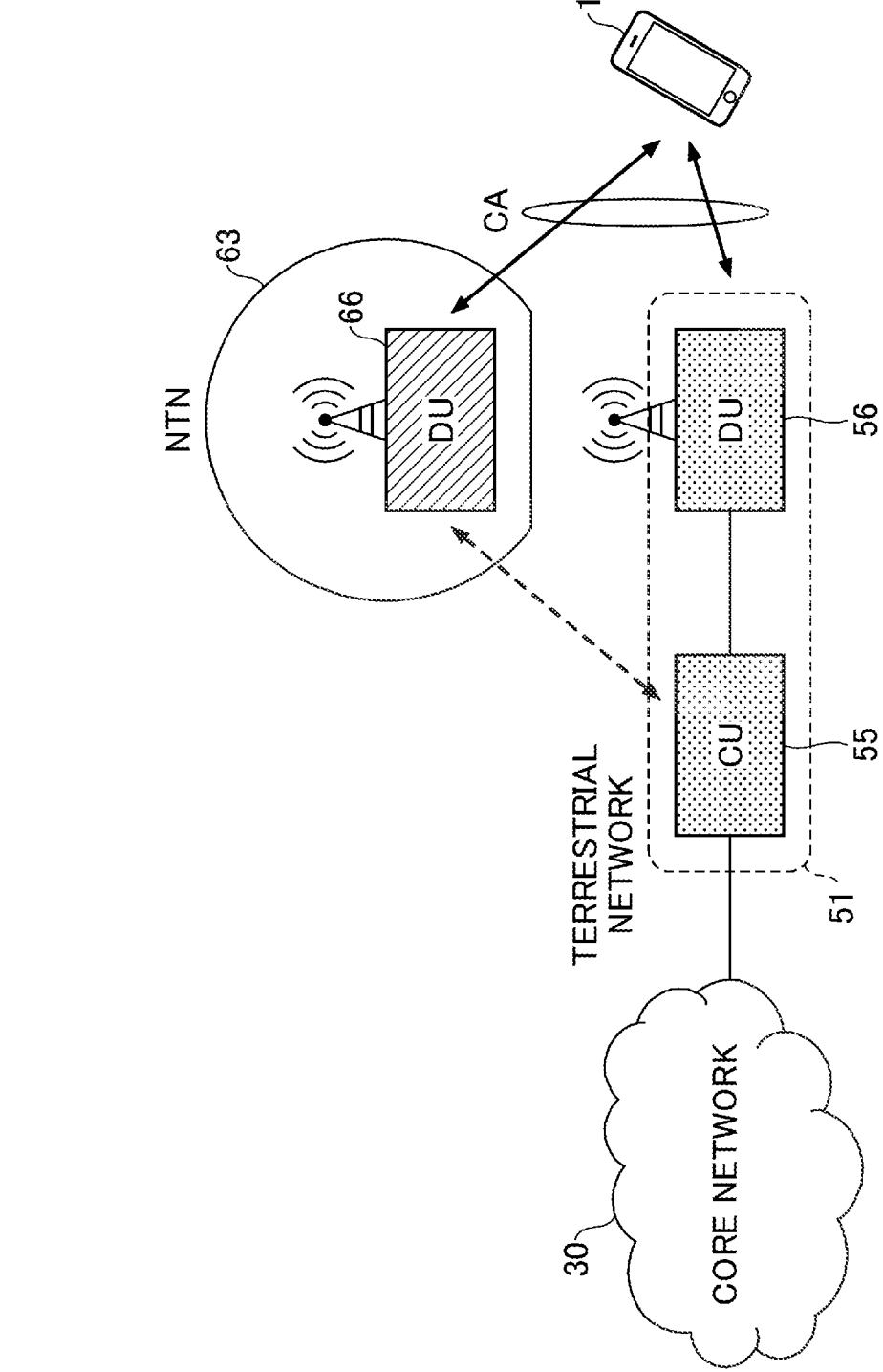
FIG. 7 is a drawing illustrating an example of carrier aggregation according to an embodiment of the present invention.

FIG. 7 is a drawing illustrating an example of carrier aggregation according to an embodiment of the present invention. As illustrated in FIG. 7, the carrier aggregation may be performed according to: a DU 66 installed in the non-terrestrial object 63 in the non-terrestrial network 60; and a DU 56 of the terrestrial network 50. The user terminal 10 performs communications with the base station 51 by transmitting and receiving wireless signals to which the carrier aggregation with the DU 66 and the DU 56 is applied.

In an example of FIG. 7, the DU 66 and the DU 56 are connected to a CU 55 of the terrestrial network, and the CU 55 is connected to the core network. In other words, the feeder link is formed between the DU 66 and the CU 55, and an NTN gateway 62 may be placed between the DU 66 and the CU 55. Note that the CU 55 may be replaced with a CU 65 of the non-terrestrial network 60.

Figure 8:
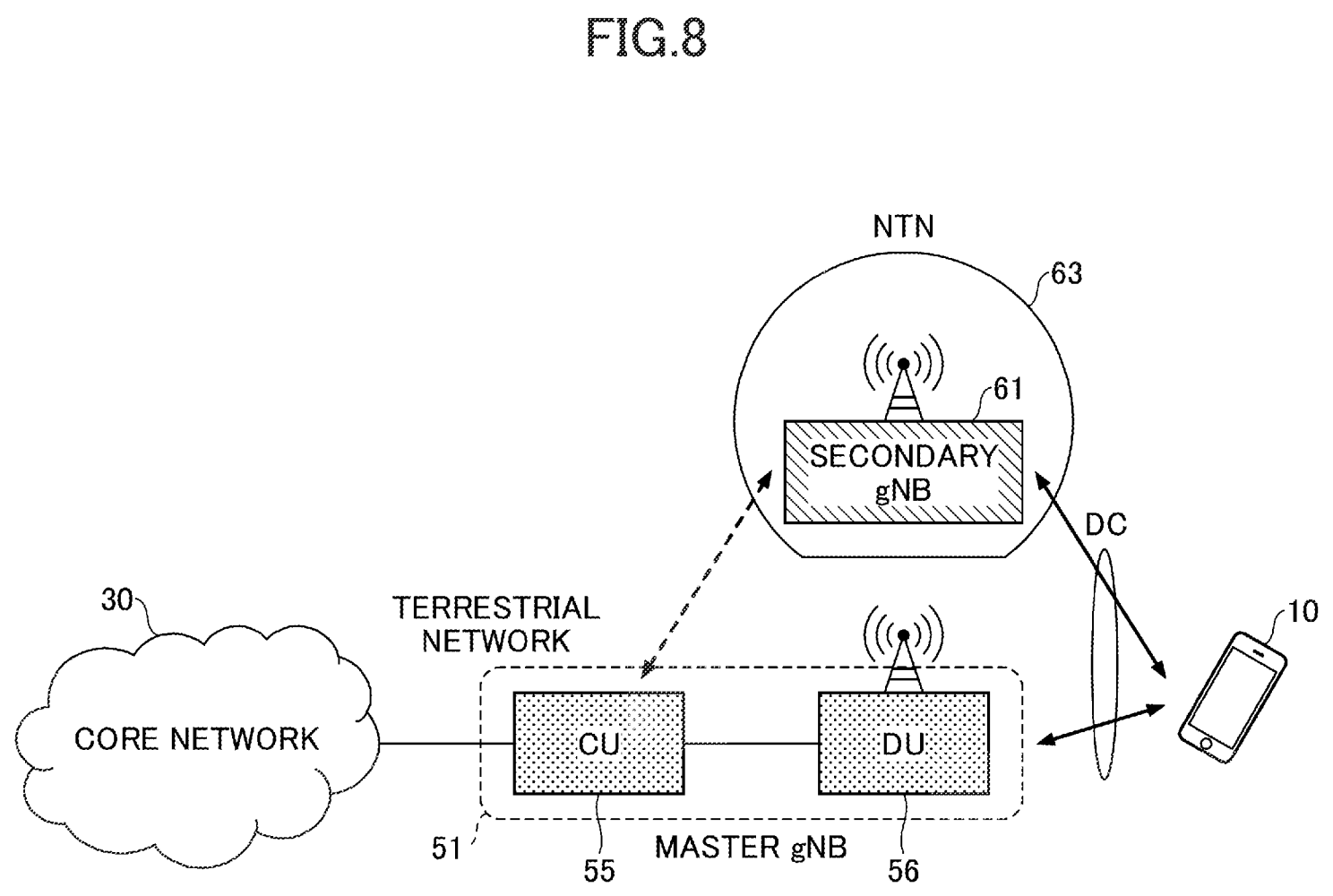

FIG. 8 is a drawing illustrating an example (1) of dual connectivity according to an embodiment of the present invention. As illustrated in FIG. 8, the dual connectivity may be performed according to: a secondary gNB 61 installed in the non-terrestrial object 63 in the non-terrestrial network 60; and a master gNB 51 of the terrestrial network 50. The user terminal 10 transmits and receives wireless signals to which the dual connectivity with the DU 56 of the master gNB 51 and the secondary gNB 61 is applied.

In an example of FIG. 8, the CU 55 of the master gNB 51 is connected to the core network. The feeder link may be formed between the secondary gNB 61 and the CU 55 of the master gNB 51, and an NTN gateway 62 may be placed between the gNB 61 and the CU 55. Note that the master gNB may be configured in the non-terrestrial network 60, and the secondary gNB may be configured in the terrestrial network 50. In addition, the master gNB 51 is not required to be divided into the CU and DU.

Figure 9:
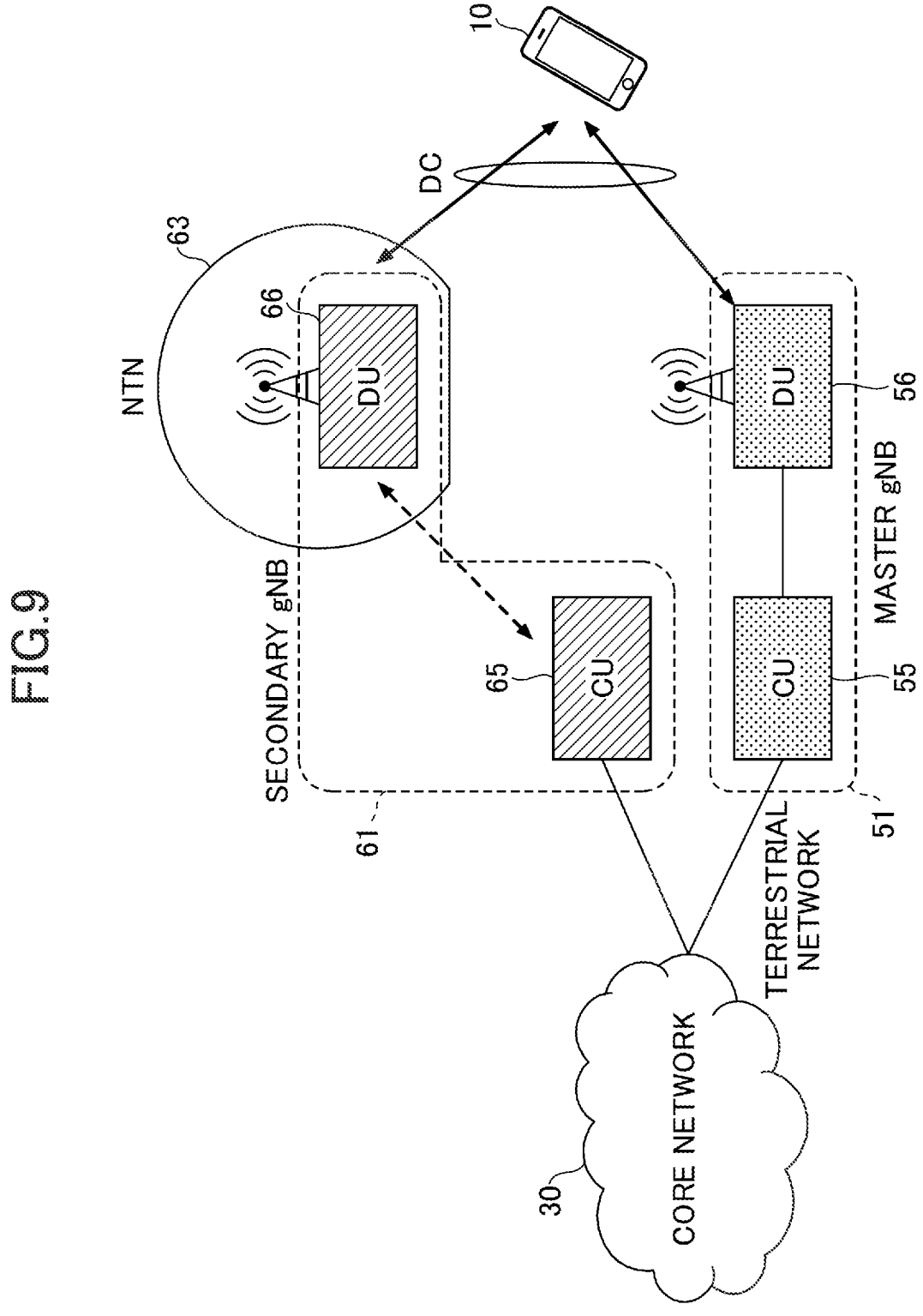
FIG. 9 is a drawing illustrating an example (2) of dual connectivity according to an embodiment of the present invention.

FIG. 9 is a drawing illustrating an example (2) of dual connectivity according to an embodiment of the present invention. As illustrated in FIG. 9, the dual connectivity according to the secondary gNB 61 of the non-terrestrial network 60 and the master gNB 51 of the terrestrial network 50 may be performed by performing wireless communications with: the DU 66 installed in the non-terrestrial object 63 in the non-terrestrial network 60; and the DU 56 of the terrestrial network. As illustrated in FIG. 9, the CU 65 of secondary gNB 61 may be placed on the ground.

In an example of FIG. 9, the CU 55 of the master gNB 51 is connected to the core network. The feeder link may be formed between the DU 66 of the secondary gNB 61 and the CU 65 of the secondary gNB 61, and an NTN gateway 62 may be placed between the DU 66 and the CU 65. Note that the master gNB may be configured in the non-terrestrial network 60, and the secondary gNB may be configured in the terrestrial network 50. In addition, the master gNB 51 is not required to be divided into the CU and DU.

Figure 10:
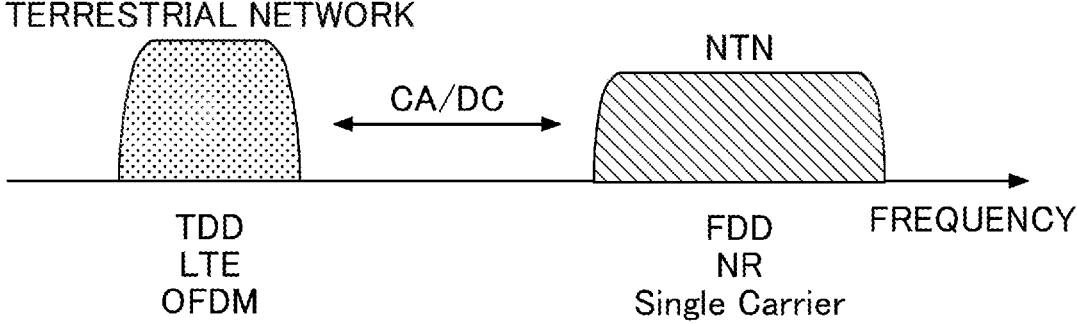
FIG. 10 is a drawing illustrating an example of a communication method according to an embodiment of the present invention.

FIG. 10 is a drawing illustrating an example of a communication method according to an embodiment of the present invention. As illustrated in FIG. 10, different communication methods may be used between the terrestrial network 50 and the non-terrestrial network 60. In an example illustrated in FIG. 10: in the terrestrial network 50, TDD is used for a multiplexing method, LTE is used for a RAT (Radio Access Technology), and OFDM is used for a waveform; and in the non-terrestrial network 60, FDD is used for a multiplexing method, NR is used for a RAT, and a single carrier is used for a waveform.

As described above, different multiplexing methods, for example, TDD and FDD, may be used between the terrestrial network 50 and the non-terrestrial network 60. In addition, different RATs such as LTE, NR, and 6G, may be used. In addition, different waveforms such as OFDM and single carrier OFDM, may be used. In addition, a plurality of different radio parameters, such as the subcarrier spacings, the CP lengths, and the like, may be applied to the terrestrial network 50 and the non-terrestrial network 60.

(Hardware Structure)

In the above functional structure diagrams used for describing an embodiment of the present invention (FIG. 4 and FIG. 5), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 11:
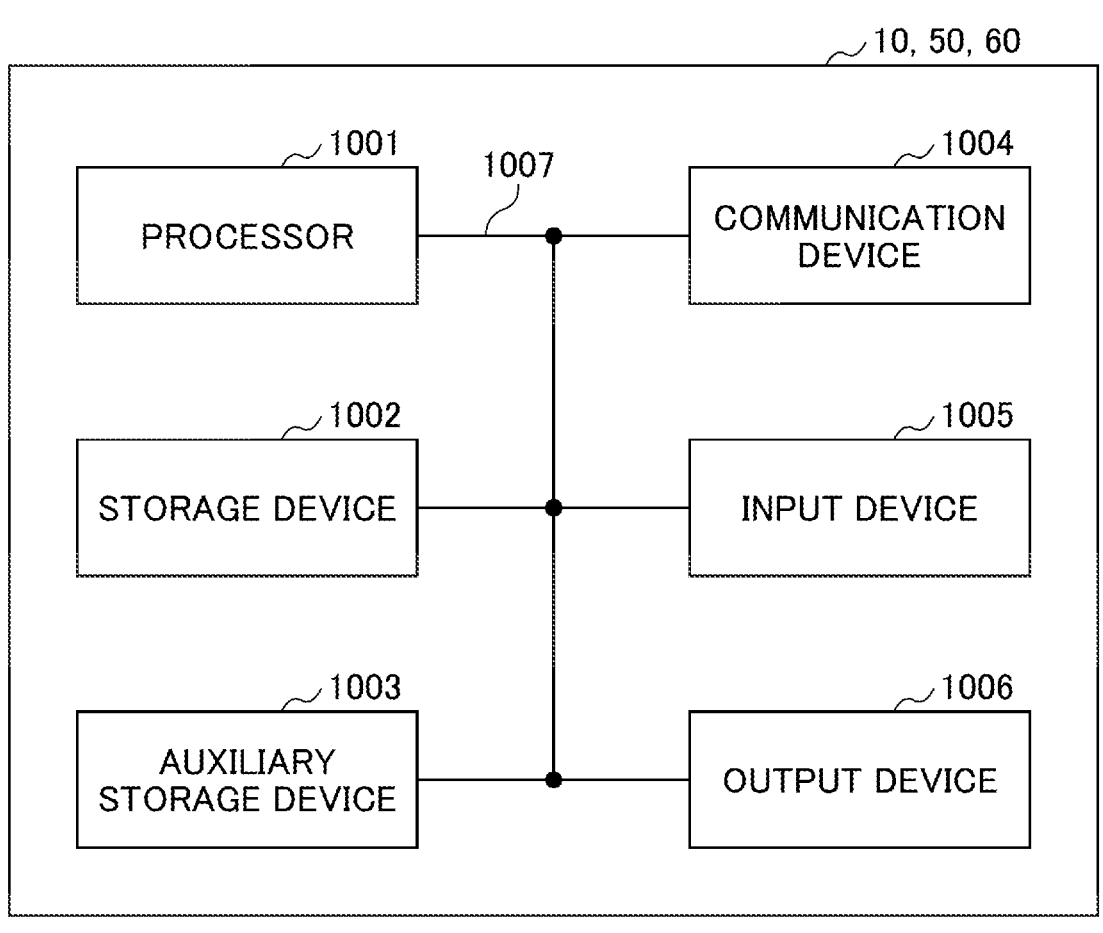
FIG. 11 is a drawing illustrating an example of a hardware configuration of each device of the non-terrestrial network 60, each device of the terrestrial network 50, and the user terminal 10 according to an embodiment of the present invention.

For example, each device of the non-terrestrial network 60, each device of the terrestrial network 50, and the user terminal 10, etc., in an embodiment of the present disclosure may function as a computer for processing the wireless communication method of the present disclosure. FIG. 11 is a drawing illustrating an example of the hardware configuration of each device of the non-terrestrial network 60, each device of the terrestrial network 50, and the user terminal 10 according to an embodiment of the present invention. Each device of the above-described non-terrestrial network 60, each device of the terrestrial network 50, and the user terminal 10 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware configuration of each device of the non-terrestrial network 60, each device of the terrestrial network 50, and the user terminal 10 may be configured to include one or more of each device shown in the figure or may be configured without some devices.

Each function of each device of the non-terrestrial network 60, each device of the terrestrial network 50, and the user terminal 10 is implemented by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 130, control unit 230, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 130 of the user terminal 10 illustrated in FIG. 4 may be implemented by control programs that are stored in the storage device 1002 and are executed by the processor 1001. In addition, for example, the control unit 230 of the non-terrestrial network 60 illustrated in FIG. 5 may be implemented by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each device of the non-terrestrial network 60, each device of the terrestrial network 50, and the user terminal 10 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

According to the above-described embodiment, communications to which the carrier aggregation and/or dual connectivity is applied can be performed in the terrestrial network and the non-terrestrial network, and the communication speed and reliability can be improved.

In other words, it is possible to improve the communication speed and reliability of the wireless communication that uses a non-terrestrial network.

Embodiment Summary

As described above, according to an embodiment of the present invention, a terminal is provided. The terminal includes: a control unit configured to establish a wireless connection between a first communication device included in a terrestrial network and a second communication device included in a non-terrestrial network; and a communication unit configured to transmit and receive a control signal and a data signal via the first communication device, the second communication device, and a gateway of the non-terrestrial network.

According to the above configuration, communications to which the carrier aggregation and/or dual connectivity is applied can be performed in the terrestrial network and the non-terrestrial network, and the communication speed and reliability can be improved.

The first communication device may be a base station and may include a first distributed node and a centralized node, and the second communication device may be a second distributed node of the base station. According to the above configuration, communications to which the carrier aggregation and/or dual connectivity is applied can be performed in the terrestrial network and the non-terrestrial network, and the communication speed and reliability can be improved.

The first communication device may be a first base station and may include a first distributed node and a first centralized node, and the second communication device may be a second base station. According to the above configuration, communications to which the dual connectivity is applied can be performed in the terrestrial network and the non-terrestrial network, and the communication speed and reliability can be improved.

The second base station may include a second distributed node and a second centralized node. According to the above configuration, communications to which the dual connectivity is applied can be performed in the terrestrial network and the non-terrestrial network, and the communication speed and reliability can be improved.

In addition, according to an embodiment of the present invention, a communication method performed by a terminal is provided. The communication method includes: establishing a wireless connection between a first communication device included in a terrestrial network and a second communication device included in a non-terrestrial network; and transmitting and receiving a control signal and a data signal via the first communication device, the second communication device, and a gateway of the non-terrestrial network.

According to the above configuration, communications to which the carrier aggregation and/or dual connectivity is applied can be performed in the terrestrial network and the non-terrestrial network, and the communication speed and reliability can be improved.

Supplement of Embodiment

As described above, one or more embodiments have been described. The present disclosure is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present disclosure. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, each device of the non-terrestrial network 60, each device of the terrestrial network 50, and the user terminal 10 have been described by using functional block diagrams. However, the apparatuses may be implemented by hardware, software, or a combination of hardware and software. The software executed by a processor included in each device of the non-terrestrial network 60, each device of the terrestrial network 50 according to an embodiment of the present invention, and the software executed by a processor included in the user terminal 10 according to an embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present disclosure but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

Specific operations described in this disclosure as being performed by a base station of the non-terrestrial network 60 may, in some cases, be performed by the upper node. In a network including one or more network nodes including the base station, it is apparent that various operations performed for communicating with the user terminal 10 may be performed by the base station and/or another network node other than the base station (for example, but not limited to, MME or S-GW). According to the above, a case is described in which there is a single network node other than the base station. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables.

The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "Base Station (BS)", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple user terminals 10 (e.g., may be referred to as D2D (Device-to-Device), V2X (vehicle-to-Everything), etc.). In this case, the function of the base station described above may be provided by the user terminal 10. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, subcarrier spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each the user terminal to allocate radio resources (such as frequency bandwidth, transmission power, etc., that can be used in each the user terminal) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in an RB may be determined based on the numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.,) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP".

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations.

Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

The present application is based on and claims priority to Japanese patent application No. 2021-052080 filed on Mar. 25, 2021, the entire contents of which are hereby incorporated herein by reference.

DESCRIPTION OF THE REFERENCE
NUMERALS

1 Wireless communication system
10 User terminal
20 Communication network
30 Core network
50 Terrestrial network
55 CU
56 DU
60 Non-terrestrial network
60A Non-terrestrial network
60B Non-terrestrial network
61 Base station
61A Base station
61B Base station
62 NTN gateway
62A NTN gateway
62B NTN gateway
63 Non-terrestrial object
63A Non-terrestrial object
63B Non-terrestrial object
65 CU
66 DU
67 Repeater
110 Transmission unit
120 Reception unit
130 Control unit 210 Transmission unit
220 Reception unit
230 Control unit

The invention claimed is:

1. A terminal comprising:
a control unit configured to establish a wireless connection between a first communication device included in a terrestrial network and a second communication device included in a non-terrestrial network; and
a communication unit configured to transmit and receive a control signal and a data signal to and from a core network via the first communication device, the second communication device, and a gateway of the non-terrestrial network,
wherein the non-terrestrial network uses a frequency higher than the frequency of the terrestrial network, and
wherein the first communication device uses Time Division Duplex (TDD) and Orthogonal Frequency Division Multiplexing (OFDM), and the second communication device uses Frequency Division Duplex (FDD) and single carrier OFDM.

2. The terminal as claimed in claim 1, wherein the first communication device is a base station and includes a first distributed node and a centralized node, and the second communication device is a second distributed node of the base station.

3. The terminal as claimed in claim 1, wherein the first communication device is a first base station and includes a first distributed node and a first centralized node, and the second communication device is a second base station.

4. The terminal as claimed in claim 3, wherein the second base station includes a second distributed node and a second centralized node.

5. A communication method performed by a terminal, the communication method comprising:
establishing a wireless connection between a first communication device included in a terrestrial network and a second communication device included in a non-terrestrial network; and
transmitting and receiving a control signal and a data signal to and from a core network via the first communication device, the second communication device, and a gateway of the non-terrestrial network,
wherein the non-terrestrial network uses a frequency higher than the frequency of the terrestrial network, and
wherein the first communication device uses Time Division Duplex (TDD) and Orthogonal Frequency Division Multiplexing (OFDM), and the second communication device uses Frequency Division Duplex (FDD) and single carrier OFDM.

* * * * *